Jan. 5, 1971   L. P. HITTEPOLE   3,552,016
CUTTING APPARATUS FOR SHEET MATERIAL
Filed Feb. 10, 1969   3 Sheets-Sheet 3
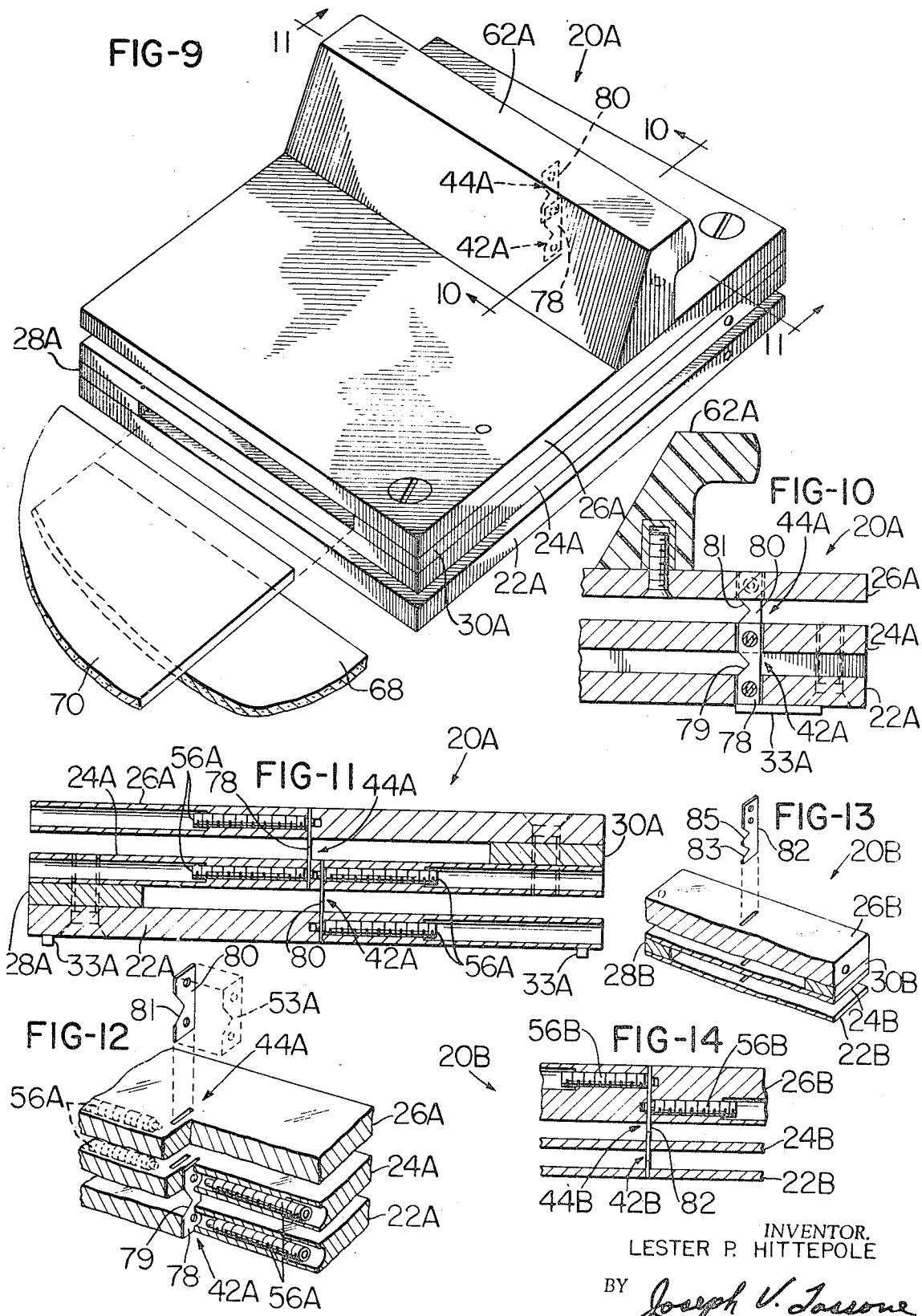
INVENTOR.
LESTER P. HITTEPOLE
BY Joseph V. Tassone
HIS ATTORNEY

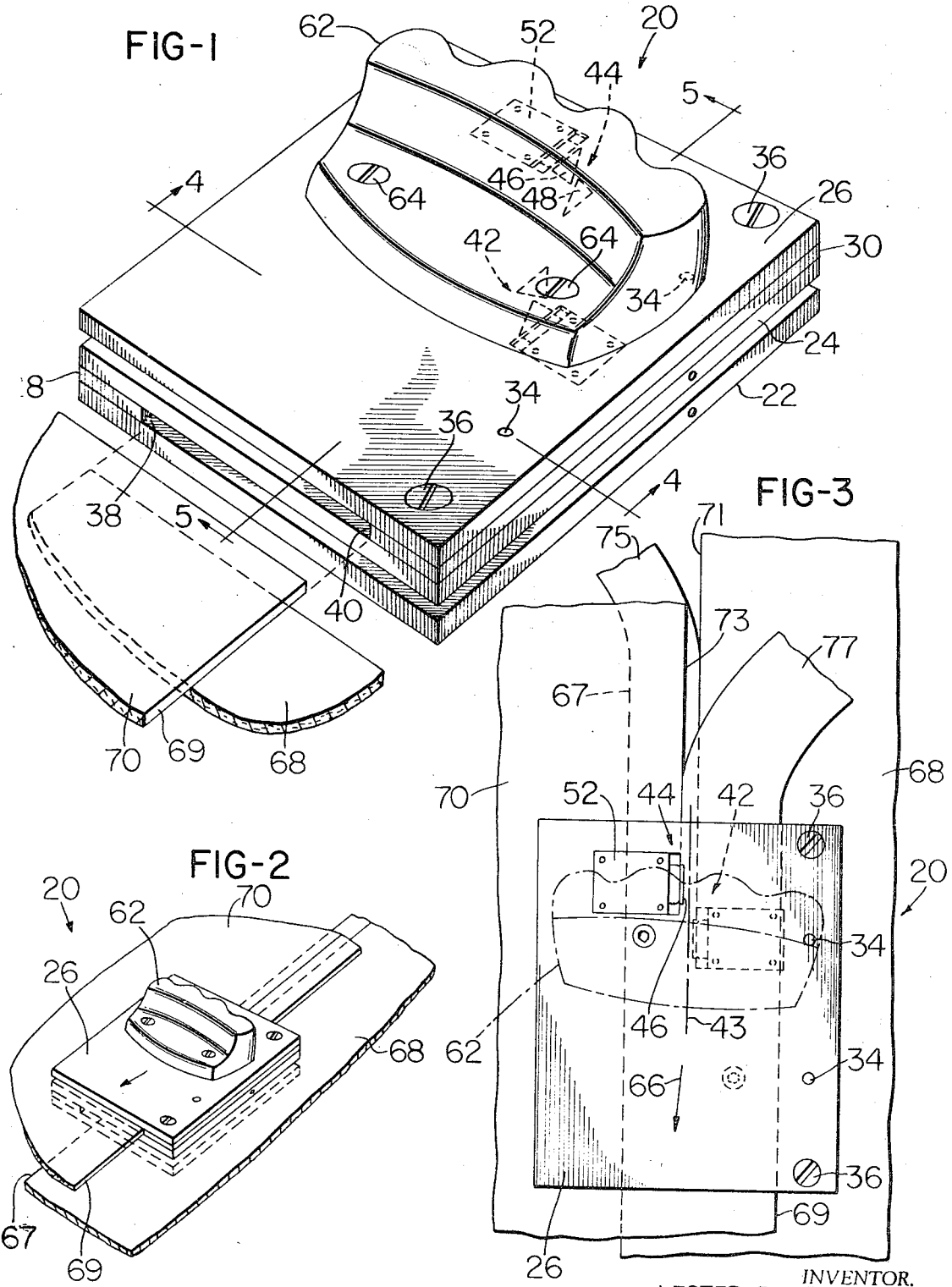

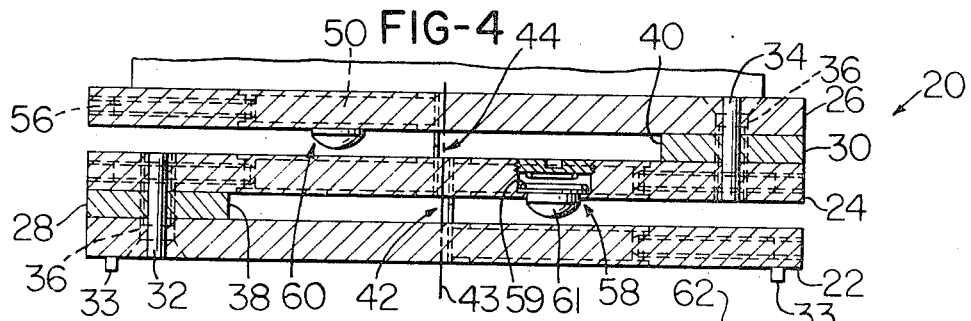
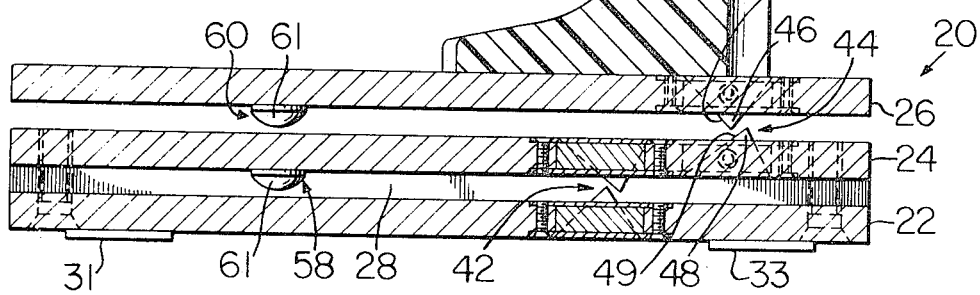
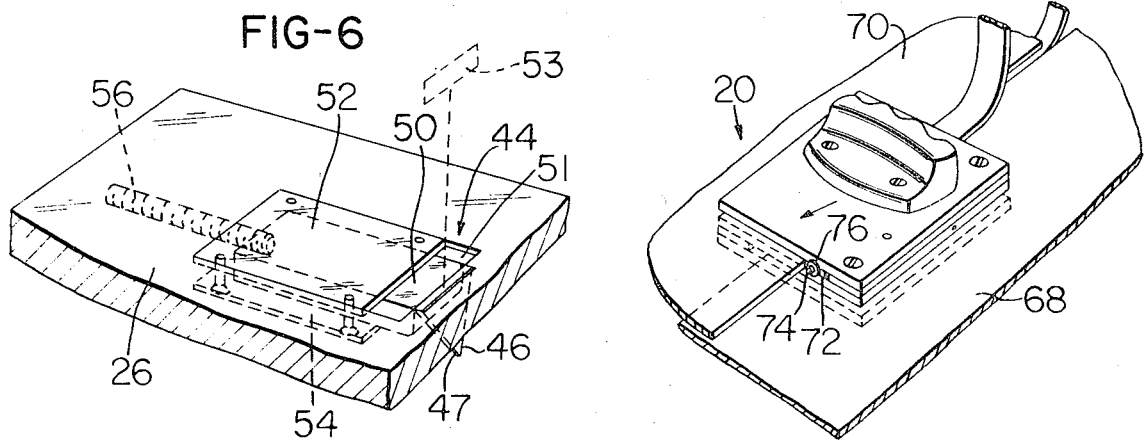
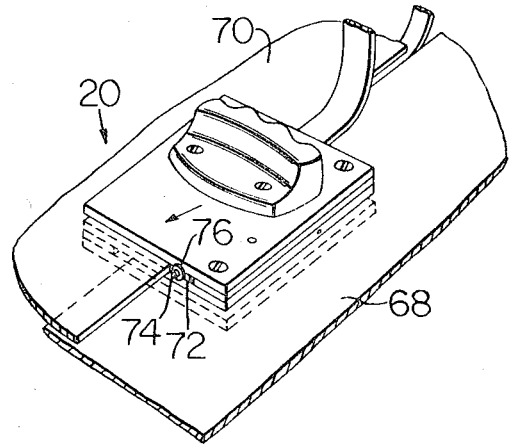
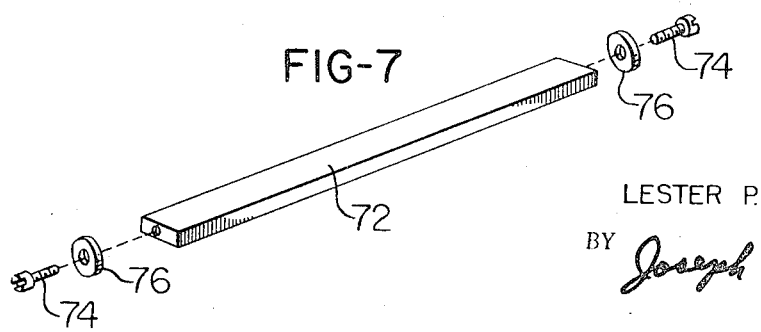

United States Patent Office 3,552,016
Patented Jan. 5, 1971

3,552,016
CUTTING APPARATUS FOR SHEET MATERIAL
Lester P. Hittepole, 2790 Prentice St.,
Dayton, Ohio 45420
Filed Feb. 10, 1969, Ser. No. 797,756
Int. Cl. B26b 3/08
U.S. Cl. 30—283                         20 Claims

ABSTRACT OF THE DISCLOSURE

A manually operable cutting apparatus for cutting overlapping sheet material for abutting alignment is disclosed. The cutting apparatus provides for the cutting of two pieces of overlapped material through the use of a plurality of cutting edges positioned to compensate for the approximate bend in the material due to the height of the cutting edges above a base surface.

BACKGROUND OF THE INVENTION

During the installation of sheet material, such as linoleum and other floor coverings, it is important that abutting edges of the two sheets of material be installed without a space therebetween. Numerous techniques have been used to cut and align the overlapped sheet material but these previously developed techniques are not entirely satisfactory. One common method is to simultaneously cut through the two layers of overlapped sheet material with a cutting blade having a straight cutting edge. This is generally unsatisfactory because the blade cannot be kept straight which results in an uneven cut. A further problem with this method is that it is more difficult to cut through two layers of the sheet material with the cutting blade than to cut through a single layer of material in order to obtain abutting edges. In addition, while cutting through the overlapped material from one side, there is a tendency for each layer of the material to have a burr type edge which prohibits proper alignment. Another commonly used technique is to use a complicated machine which incorporates a saw element to simultaneously cut through two pieces of sheet material to produce the straight seam. A disadvantage of this machine, besides its high cost, is that the saw element produces cuttings and hence the machine requires a vacuum unit to be attached thereto.

SUMMARY

This invention provides an improved cutting apparatus for cutting overlapped sheet material for abutting alignment. The cutting apparatus is of simple and economical construction, is easy to operate with one hand, produces no cuttings or burr edges, and uses inexpensive cutting blades which can be easily installed and properly aligned.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a perspective view illustrating one exemplary embodiment of this invention showing the typical overlap of sheet material in which the factory edge of the top layer of material engages a guide wall of the cutting apparatus;

FIG. 2 is a perspecitve view illustrating the cutting apparatus in the operating position;

FIG. 3 is a top view of a typical cutting action of the cutting apparatus of FIG. 1;

FIG. 4 is a cross-secitonal view taken on the line 4—4 of FIG. 1;

FIG. 5 is a cross-sectional view taken on the line 5—5 of FIG. 1;

FIG. 6 is a greatly enlarged fragmentary perspective view particularly illustrating the structural mounting features for a single cutting member;

FIG. 7 is a perspective view of a spacer bar for use with the cutting apparatus of FIG. 1;

FIG. 8 is a perspective view similar to FIG. 2 showing the use of the spacer bar of FIG. 7;

FIG. 9 is a perspective view illustrating another exemplary embodiment of this invention and particularly illustrating different cutting members by dotted lines;

FIG. 10 is a cross-sectional view taken on the line 10—10 of FIG. 9;

FIG. 11 is a cross-sectional view taken on the line 11—11 of FIG. 9;

FIG. 12 is a fragmentary perspective view showing the mounting means of the cutting element of FIG. 9;

FIG. 13 is a fragmentary perspective view of another exemplary embodiment of the cutting apparatus of this invention and particularly illustrating a further cutting member configuration; and FIG. 14 is a fragmentary sectional view of FIG. 13.

DESCRIPTION OF ILLUSTRATED EMBODIMENTS

Reference is now made to FIGS. 1 and 4 of the drawings, which illustrates one exemplary embodiment of the improved cutting apparatus of this invention, which is designated generally by the reference numeral 20. The cutting apparatus is comprised of a bottom plate 22, a middle plate 24, and a top plate 26, respectively separated by mounting members 28 and 30. The thickness of the mounting members 28 and 30 is made slightly greater than the greatest thickness of the sheet material to be cut to assure optimum versatility.

The plates 22, 24 and 26 and mounting members 28 and 30 are aligned by dowels 32 and 34 and secured by any suitable means such as screws 36. The alignment is such that the inner walls 38 and 40 of mounting members 28 and 30 are parallel to each other and form guide walls, the purposes of which will be explained herebelow. Runners 31 and 33 are attached to bottom plate 22 to keep the cutting apparatus above the thickness of the adhesive used to secure the sheet material to a base surface.

The cutting apparatus 20 has two cutting stations 42 and 44. The first station 42 is between the bottom plate 22 and middle plate 24 and the second station 44 is between the middle plate 24 and the top plate 26.

As seen in FIGS. 4 and 5, the cutting stations 42 and 44 are axially spaced in the direction of cutting movement along the main axis of the cutting apparatus 20 as well as being staggered or placed on either side of a centerline 43 between guide walls 38 and 40. The staggered cutting stations compensate for the thickness of the bottom and middle plates 22 and 24 and assure that the cut edges of the sheet material will abut perfectly once the cutter 20 is removed. The axial displacement of the cutting stations provides for an easier start of cutting since only one layer of sheet material is initially engaged to cut for a short distance.

As best seen in FIGS. 5 and 6, cutting station 44 is comprised of two separate cutting members or elements 46 and 48. Each of the cutting elements has a knife-like edge, 47 and 49 respectively, which extends into the space between the middle plate 24 and the top plate 26 to form a substantially V-shaped cutting surface or configuration. The edges 47 and 49 are slightly spaced apart along an axis in the direction of movement of the cutting apparatus and are also slightly overlapped in the vertical cutting plane as shown in FIG. 5. Thus, as the cutting apparatus 20 is moved relative to the sheet material and the sheet material passes through the cutting station, the knife-like edges of the cutting elements engage the upper and lower surfaces of the sheet material and sever this material from both sides and thereby prevent the occurrence of burring of any edges.

Cutting element 46 is mounted in top plate 26 through the use of a slide member 50 which engages one side of cutting element 46 and forces the opposite side of the cutting element against a control surface of the top plate 26. The slide member 50 is slidably mounted in a hole 51 in the top plate 26 and secured therein by supporting plates 52 and 54 which are securely attached by any suitable means such as screws. A set screw 56 is threadably inserted in the top plate 26 and engages one end of the slide member 50. Thus, by tightening the set screw 56, the cutting element 46 will be forced against the control surface and hence is locked in place by the slide member 50. If it is desired to adjust the cutting angle of the knife edge of the cutting element 46 or to replace the cutting element, it is only necessary to loosen the set screw 56 which will release or unlock the slide member and allow the adjustment or removal of the cutting element. While the above description refers specifically to the upper cutting element 46 of cutting station 44, each of the other cutting elements are similarly mounted on adjusted and need not be specifically described herein.

An advantage of the cutting apparatus of this invention is that the cutting edges of each cutting station may be aligned and positioned parallel to each other and thereby insuring proper alignment of the cut sheet material. This may be accomplished by inserting a shim element, such as shim 53 shown by dotted lines in FIG. 6, either between the cutting element and the slide member or the cutting element and the respective control surface of the plate.

Resilient spring means 58 and 60, each comprised of a compression spring 59 and a substantially hat-shaped button 61, are respectively mounted in the middle plate 24 and top plate 26 and extend downward into the space between the respective plates as seen in FIGS. 4 and 5. Thus, the downward extending spring means will engage any sheet material passing through the respective space to insure that the sheet material is held flat for proper engagement with the respective cutting stations.

A handle 62 is attached to the top plate 26 at any suitable means such as screws 64. The handle 62 is secured to the top plate at a slight angle with respect to the normal axis of the cutting apparatus so that the propelling force applied by the operator is at a slight angle to the direction of travel of the cutting apparatus, as shown by arrow 66 in FIG. 3.

The cutting apparatus 20 is used after two or more pieces of sheet material 68 and 70, such as linoleum, have had their outer edges abutted against an associated wall and the two inner edges or factory edges 67 and 69, respectively, form an overlapped seam area. In an optimum condition, the overlapped distance of the sheet material is nearly the same as the fixed distance between guide walls 38 and 40 as seen in FIGS. 1 and 3. To make the butted seam in this condition, the lower layer of sheet material 68 is inserted between the bottom plate 22 and middle plate 24 and the upper layer of sheet material 70 is inserted between the middle plate 24 and the upper plate 26. In this optimum condition, the factory edge 67 of the bottom layer 68 is closely adjacent the guide wall 38. The factory edge 69 of the top layer 70 of material rests against the guide wall 40 which is used to guide the cutting apparatus relative to the sheet material. The cutting action takes place as shown in FIG. 3 in which the cutting distance or transverse displacement is exaggerated from a true showing for purposes of explanation. The cut edges are shown as 71 and 73, respectively, with 75 and 77 being that portion of sheet material 68 and 70 which is to be discarded. Thus, when the cut has been completed, edges 71 and 73 will be abutted together to form the precisely cut seam. Because of the angular attachment of the handle and the propelling force 66, guide wall 40 is maintained against the factory edge of layer 70 which helps to guide the cutting apparatus along the base surface in a straight line.

When the overlap of the layers of sheet material is substantially less than the fixed distance between the guide walls, the upper layer is abutted against the upper guide wall 40, such as shown in FIG. 2. Thus, when the cutting apparatus 20 is propelled along the sheet material, the force 66 will hold the upper guide wall 40 against the factory edge of the upper layer of sheet material to assure proper abutting of the cut material. When the overlap is greater than the fixed distance between the two guide walls, one of the edges of the overlapped material is cut so that the resulting overlap is no greater than the distance between the guide walls. It is desirable in this instance to shorten the lower layer of sheet material so that the factory edge is maintained on the upper layer of sheet material for engagement with the upper guide wall.

If the overlap of the sheet material is so small that the alignment of the factory edge with one of the guide walls will position the cutting apparatus so that only one layer can be cut, a spacer bar 72 as shown in FIGS. 7 and 8 may be used. In this case, the spacer bar 72 is inserted between the middle plate 24 and top plate 26 and secured at some position between the guide wall 40 and cutting station 44, so that both cutting stations 42 and 44 will engage the sheet material. The spacer bar must be placed parallel to guide wall 40 for proper alignment and is held in place by any suitable means such as the screws and washers 74 and 76.

The cutting apparatus 20 of this invention may also be used to cut "matched pattern" sheet material. These sheets come with a protection strip on the edge and the two pieces of material are first placed so that only the protection strips overlap. The cutting apparatus is adjusted by positioning of the spacer bar to cut off only the overlapped protection strips which insures that the patterns will match.

Another exemplary embodiment of this invention is illustrated in FIG. 9 of the drawings. The cutting apparatus illustrated in FIG. 9 is very similar to the cutting apparatus 20; therefore, such cutting apparatus will be designated generally by the reference numeral 20A and parts of the cutting apparatus 20A which are very similar to corresponding parts of the cutting apparatus 20 will be designated by the same reference numeral as cutting apparatus 20 also followed by the letter designation "A" and not described again. The main difference between the cutting apparatus 20A and the cutting apparatus 20 is in the cutting elements of the respective cutting stations 42A and 44A. In this embodiment, each respective cutting station 42A and 44A, is comprised of a single cutting element 78 and 80, respectively. Each cutting element 78 and 80 is formed with a substantially V-shaped cutting surface 79 and 81, respectively, in the space between the respective plates. Thus, cutting element 78 is mounted between bottom plate 22A and middle plate 24A and cutting element 80 is mounted between middle plate 24A and top plate 26A. Each cutting element has apertures therethrough and set screws 56A protrude through the apertures so that when said set screws are tightened, the respective cutting elements are urged against the control surface of the corresponding plate and locked in place. It is seen in this configuration that the cutting stations are displaced transverse to the axis of movement of the cutting apparatus 20A as previously described without the necessity of axial displacement of the cutting station because of the different mounting structure. Alignment of the cutting element can be made by the use of shims 53A, shown by dotted lines in FIG. 12 and as previously described, since the slots in which the cutting elements 78 and 80 fit are made greater than the thickness of the cutting elements.

Another exemplary embodiment of this invention is illustrated in FIGS. 13 and 14. Only a fragmentary view is illustrated showing essentially another embodiment of the cutting stations which may be utilized in a cutting apparatus construction and will be designated by the same reference numerals followed by the letter designation "B" and not described again. In this embodiment, a singular cutting element 82 forms both cutting stations 42B and 44B. Substantially V-shaped cutting edges 83 and 85 are formed in element 82 which correspond with the respective space between the respective plates 22B, 24B, and 26B. The cutting element 82 is secured in the cutting apparatus 20B by the use of set screws 56B. In this embodiment, it is seen that the bottom and middle plates 22B and 24B can be of a thinner thickness and the top plate 26B is thickened so as to permit the insertion of both set screws 56B.

In this embodiment, there is no axial or transverse displacement of the cutting stations. The bottom and middle plates are so thin that the arc formed in the material due to the height of the plates is negligible and the operator need not worry about the buckling of the material. The V-shaped cutting edges insure that no burrs are produced.

While the cutting apparatus hereinabove described has been specifically described and shown for use with the handle in one position, the angle of attachment of the handle means can be varied and still insure that the propelling force will maintain one factory edge against one guide wall.

In can be seen that it is possible to cut contour and pattern seams as well as straight seams with the cutting apparatus of this invention. Thus, this invention provides a cutting apparatus which is of simple and economical construction, is easy to operate, and produces no cuttings or burr edges.

While present exemplary embodiments of this invention have been illustrated and described it will be recognized that this invention may be otherwise variously embodied and practiced by those skilled in the art.

What is claimed is:

1. A manually operable cutting apparatus for cutting overlapping sheet material for abutting alignment comprising, a bottom plate, means mounting a middle plate above said bottom plate a distance slightly greater than the thickness of the sheet material, said means providing a guide wall between said bottom and middle plate, second means along the other side of the middle plate for mounting a top plate above said middle plate a distance slightly greater than the thickness of the sheet material, said second means providing a second guide wall between said middle and top plate and parallel to said first guide wall, a first cutting station extending between said bottom and middle plate for cutting the sheet material inserted between the bottom and middle plates, a second cutting station extending between said middle and top plate for cutting the sheet material inserted between the middle and top plates, said second cutting station being aligned relative to said first cutting station so that sheet material cut by said first and second cutting stations can be butted together, and handle means attached to said top plate for an operator to grasp and move the cutting apparatus relative to the sheet material.

2. A cutting apparatus as set forth in claim 1, in which said first and second cutting stations are axially displaced one to the other along an axis in the direction of the movement of the cutting apparatus, said first and second cutting stations further comprising cutter elements having knife-like cutting edges and having a substantially V configuration so that each respective sheet material is cut both from the upper and lower surfaces so as to avoid burring of the sheet material.

3. A cutting apparatus as set forth in claim 1 in which each of said first and second cutting stations comprises a separate upper and lower cutting member and thus defines four separate cutting members, said four cutting members being each independently and adjustably mounted in the cutting apparatus, the cutting members forming said first cutting means being mounted respectively in the bottom plate and the middle plate with the cutting edges extending into the space between the respective plates so that any sheet material passing therebetween is severed both from its top and bottom surfaces, the cutting members forming said second cutting station being respectively mounted in the middle plate and the top plate with the respective cutting edges extending into the space between the respective plates so that the sheet material passing therebetween will be severed from its top and bottom surfaces.

4. Cutting apparatus as set forth in claim 1 in which said first cutting station comprises a single cutting blade having a substantially V-shaped cutting edge mounted between said bottom and middle plates, said second cutting station comprises a single cutting blade having a substantially V-shaped cutting edge mounted between said middle and top plates.

5. A cutting apparatus as set forth in claim 1 in which said first and second cutting stations comprise a single cutting blade mounted normal to the main axis of said cutting apparatus, said single blade having substantially V-shaped cutting edges displaced between the respective plates so that any sheet material passing therethrough will be severed by said V-shaped cutting edges.

6. A cutting apparatus as set forth in claim 2 in which said first and second cutting stations are displaced transverse to the axis of movement of the apparatus to compensate for the thickness of the middle plate and bottom plate and the height of the said plate above a base surface on which the sheet material is placed so as to assure that the cut edges will abut perfectly.

7. A cutting apparatus as set forth in claim 6 in which means are provided to permit minor adjustment in the transverse displacement of each of said cutter elements to compensate for difference in thicknesses of said sheet material and to permit vertical alignment of said cutter elements.

8. A cutting apparatus as set forth in claim 7 in which said means comprises shim members interposed between each cutting means and the respective bottom, middle and top plate so that said cutting means may be individually adjusted to insure vertical alignment relative to each other.

9. A cutting apparatus as set forth in claim 1 further comprising first and second resilient means respectively mounted in said middle and top plate, each of which respectively extends downward into the space between said plates to engage sheet material inserted therebetween to insure that the sheet material is held flat therein for proper engagement with said cutting stations, and said handle means being attached at an angle relative to the main axis of the cutting apparatus so that the propelling force is slightly transverse to the main axis to thereby maintain the second guide wall against the edge of the upper sheet material during relative movement therebetween.

10. A cutting apparatus as set forth in claim 8 further comprising a removably mountable guide bar for insertion between said middle and top plate to provide an adjustably established guide surface when the overlap of the sheet material is insufficient for normal usage, and said handle means being adjustably attached to said top plate so that said handle may be adjusted to assure that the propelling force will always be slightly transverse to the cutting plane and thereby insure that the sheet material edge is maintained against a guide wall.

11. A manually operable cutting apparatus to cut overlapping sheet material for abutting alignment comprising, a bottom plate, a middle plate disposed above said bottom plate for receiving the sheet material therebetween, a top plate disposed above said middle plate for receiving a second sheet material therebetween, a first guide member secured between said bottom and middle plate and along one side thereof and providing a guiding wall at the inward edge, a second guide member secured between said middle and top plate and along the opposite side thereof and providing a second guiding wall at the inward edge parallel to the first guiding wall, first cutting means having a cutting edge extending between said bottom and middle plate for cutting sheet material inserted between said bottom and middle plate, the cutting edge material inserted between said edge being parallel to said guide walls, second cutting means having a cutting edge extending between said middle and top plate for cutting sheet material inserted between said middle and top plate, the cutting edge of said second cutting member being parallel to said first cutting edge and transversely displaced from the cutting plane of the first cutting means to compensate for the thickness of the middle plate and height of the plates above a base surface on which the sheet material is placed and to assure that the cut edges will abut perfectly, each of said first and second cutting means having knife-like cutting edges of substantially V-shaped configuration so that each respective sheet material is cut both from the upper and lower surface, and handle means attached to said top plate enabling an operator to grasp and move the cutting apparatus relative to the sheet material, said handle means being attached at an angle relative to the main axis of the cutting apparatus so that the propelling force is slightly transverse to the main axis of the cutting apparatus so that the edge of the upper sheet material will be maintained against the second guide wall.

12. A cutting apparatus as set forth in claim 11 in which said first and second cutting means are axially displaced one to the other along the axis of movement of the apparatus.

13. A cutting apparatus as set forth in claim 11 in which each of said first and second cutting means comprises a separate upper and lower cutting member, each of said cutting members being independently and adjustably mounted in the cutting apparatus, the cutting members forming said first cutting means being mounted respectively in the bottom plate and the middle plate with the cutting edges extending into the space between the respective plate so that any sheet material passing therebetween is severed both from the top and bottom surfaces, the cutting members forming said second cutting means being respectively mounted in the middle plate and the top plate with the respective cutting edges extending into the space between the respective plates so that the sheet material passing therebetween will be severed from both the top and bottom surfaces.

14. A cutting apparatus as set forth in claim 13 in which the cutting edge of each cutting member in said first and second cutting means is axially spaced along an axis in the direction of cutting movement and the cutting edges further overlap in the vertical cutting plane.

15. Cutting apparatus as set forth in claim 11 in which said first cutting means comprises a cutting blade mounted between said bottom and middle plates, said second cutting means comprises a cutting blade mounted between said middle and top plates, and further comprising shim means interposed between each cutting blade and the respective bottom, middle and top plate so that each cutting blade may be individually adjusted relative to each other.

16. A cutting apparatus as set forth in claim 11 further comprising first and second resilient means respectively comprising first and second resilient means respectively mounted in said middle and top plate and respectively extending downward into the space between said middle and bottom plate and top and middle plate to engage sheet material inserted therebetween to insure that the sheet material is held flat therein for proper engagement with said cutting means, said handle means being attached at an angle relative to the main axis of the cutting apparatus so that the propelling force is slightly transverse to the main axis and thereby maintaining the edge of the upper sheet material against the second guide wall during relative movement therebetween.

17. A cutting apparatus as set forth in claim 11 further comprising a removably mountable guide bar for insertion between said middle and top plate to provide an adjustably established guide surface when the overlap of the sheet material is insufficient for normal usage, said handle means being adjustably attached to said top plate so that said handle may be adjusted to assure that the propelling force will always be slightly transverse to the cutting plane and thereby insure that the sheet material edge is maintained against a guide wall.

18. A cutting apparatus as set forth in claim 16 in which each of said resilient means includes a compression spring and a removable contacting button.

19. A cutting apparatus as set forth in claim 18 further comprising runners on said bottom plate to hold the cutting apparatus above the base surface on which the sheet material is placed.

20. A cutting apparatus as set forth in claim 17 in which said guide bar is secured in place by a screw and washer at each end thereof to engage with said middle and top plate.

References Cited

UNITED STATES PATENTS

| | | | |
|---|---|---|---|
| 1,589,156 | 6/1926 | Hartman | 30—294 |
| 1,776,046 | 9/1930 | Schmidt | 30—293 |
| 3,079,688 | 3/1963 | Ryan | 30—294 |
| 3,148,448 | 9/1964 | Gragg | 30—293X |
| 3,407,498 | 10/1968 | Young | 30—293 |

FOREIGN PATENTS

| | | | |
|---|---|---|---|
| 137,031 | 12/1902 | Germany | 30—293 |

THERON E. CONDON, Primary Examiner

J. C. PETERS, Assistant Examiner

U.S. Cl. X.R.

30—294, 305